(12) United States Patent
Coppola et al.

(10) Patent No.: US 10,487,778 B2
(45) Date of Patent: Nov. 26, 2019

(54) COMPOSITE ENGINE ARCHITECTURE, AND METHOD OF MANUFACTURING THE SAME

(71) Applicant: GM Global Technology Operations LLC, Detroit, MI (US)

(72) Inventors: Anthony M. Coppola, Rocheter Hills, MI (US); Hamid G. Kia, Bloomfield Hills, MI (US); Paul M. Najt, Bloomfield Hills, MI (US); Russell P. Durrett, Bloomfield Hills, MI (US); Michael A. Potter, Grass Lake, MI (US); Peter P. Andruskiewicz, Ann Arbor, MI (US); David J. Brooks, Pontiac, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/829,449

(22) Filed: Dec. 1, 2017

(65) Prior Publication Data

US 2019/0170086 A1     Jun. 6, 2019

(51) Int. Cl.
| | |
|---|---|
| *F02F 7/00* | (2006.01) |
| *B29C 70/68* | (2006.01) |
| *F02F 1/14* | (2006.01) |
| *F02F 1/38* | (2006.01) |
| *B33Y 10/00* | (2015.01) |
| *B33Y 80/00* | (2015.01) |

(Continued)

(52) U.S. Cl.
CPC ............ *F02F 7/0085* (2013.01); *B29C 70/68* (2013.01); *F02F 1/14* (2013.01); *F02F 1/38* (2013.01); *F02F 7/0095* (2013.01); *B29K 2705/00* (2013.01); *B29L 2031/748* (2013.01); *B33Y 10/00* (2014.12); *B33Y 80/00* (2014.12); *F02F 1/242* (2013.01); *F02F 1/4285* (2013.01); *F02F 2001/245* (2013.01)

(58) Field of Classification Search
CPC .. B29K 2077/00; F02F 7/0085; F02F 7/0095; F02F 7/0073; F02F 7/0087
See application file for complete search history.

(56) References Cited

U.S. PATENT DOCUMENTS

| | | | | |
|---|---|---|---|---|
| 4,222,360 A | * | 9/1980 | Fujikawa ................. | F01P 1/02 123/195 C |
| 4,644,911 A | * | 2/1987 | Hidaka ................... | F02B 75/20 123/184.61 |

(Continued)

*Primary Examiner* — Long T Tran
(74) *Attorney, Agent, or Firm* — Quinn IP Law (57) ABSTRACT

An engine block assembly includes a head structure assembly, and a cylinder structure assembly. A plurality of fasteners interconnect the head structure assembly and the cylinder structure assembly. An outer shell encapsulates and supports both the head structure assembly and the cylinder structure assembly. The outer shell is a unitary polymer structure that is simultaneously over-molded onto the head structure assembly and the cylinder structure assembly. The head structure assembly and the cylinder structure assembly are constructed of components that are designed to carry the operational loads of the engine with minimal weight. The outer shell provides additional structural integrity, and provides fluid passages for lubrication and cooling, as well as support for other engine components.

20 Claims, 7 Drawing Sheets

(51) Int. Cl.
  *B29K 705/00* (2006.01)
  *B29L 31/00* (2006.01)
  *F02F 1/42* (2006.01)
  *F02F 1/24* (2006.01)

(56) References Cited

U.S. PATENT DOCUMENTS

| | | | | |
|---|---|---|---|---|
| 4,848,292 | A * | 7/1989 | Holtzberg | F02F 7/0085 |
| | | | | 123/193.3 |
| 4,930,470 | A | 6/1990 | Kabat et al. | |
| 5,058,542 | A * | 10/1991 | Grayson | F01M 13/0011 |
| | | | | 123/193.5 |
| 5,083,537 | A * | 1/1992 | Onofrio | F02F 1/108 |
| | | | | 123/195 C |
| 9,222,434 | B2 * | 12/2015 | Resch | F02F 1/002 |
| 9,644,568 | B2 * | 5/2017 | Maki | F02F 7/0095 |
| 2007/0262486 | A1 * | 11/2007 | Waters | B29C 45/14467 |
| | | | | 264/220 |
| 2014/0137833 | A1 * | 5/2014 | Buehler | F02F 7/00 |
| | | | | 123/195 C |
| 2016/0298766 | A1 * | 10/2016 | Kawai | F16J 15/062 |
| 2017/0159605 | A1 * | 6/2017 | Cutrona | B29C 45/14819 |

* cited by examiner

COMPOSITE ENGINE ARCHITECTURE, AND METHOD OF MANUFACTURING THE SAME

INTRODUCTION

The disclosure generally relates to a composite engine block assembly, and a method of manufacturing the same.

Traditionally, an engine block and a cylinder head of an engine block assembly are each cast and/or machined from a solid piece of metal, such as cast iron or aluminum. Due to existing casting and machining processes, solid metal blocks and cylinder heads contain more material than is necessary to withstand the forces generated during operation. This extra material increases the weight of these components, i.e., the engine block and cylinder head. In an attempt to lighten these components, the engine block and cylinder head have previously been manufactured from composite polymer materials. These previous attempts at manufacturing the engine block and the cylinder head from composite polymers attempted to replicate the design and shape of the existing solid metal components. As such, they did not change the architecture of the engine block assembly and/or manufacturing process used to assembly the engine block assembly.

SUMMARY

An engine block assembly is provided. The engine block assembly includes a head structure assembly, and a cylinder structure assembly. A plurality of fasteners interconnect the head structure assembly and the cylinder structure assembly. An outer shell encapsulates and supports both the head structure assembly and the cylinder structure assembly. The outer shell is a unitary polymer structure.

In one aspect of the engine block assembly, the head structure assembly includes a head framework. The head framework includes an intake port, an exhaust port, and an upper combustion chamber portion. In one embodiment, the head framework is manufactured from a metal.

In another aspect of the engine block assembly, the head structure assembly includes an intake valve guide and an exhaust valve guide. The intake valve guide is operable to slideably support an intake valve to open and close fluid communication through the intake port. The exhaust valve guide is operable to slideably support an exhaust valve to open and close fluid communication through the exhaust port.

In one aspect of the engine block assembly, the outer shell defines at least one fluid passage that is operable to circulate a fluid therethrough. In one embodiment, the outer shell defines a head coolant passage that is disposed adjacent to the head framework. The head coolant passage is operable to circulate a coolant for cooling the head framework. In another embodiment, the outer shell may further define a cylinder coolant passage that is disposed adjacent to a cylinder sleeve of the cylinder structure assembly. The cylinder coolant passage is operable to circulate a coolant for cooling the cylinder sleeve. In yet another embodiment, the outer shell may further define a lubrication passage for circulating an engine lubricant therethrough.

In one aspect of the engine block assembly, the outer shell permanently secures the head framework relative to the cylinder structure assembly, such that the head framework is not removable from the cylinder structure assembly.

In one aspect of the engine block assembly, the head structure assembly includes an upper support plate engaging the plurality of fasteners. In one embodiment, the upper support plate is integrally formed with the head framework as a single manufacture. In another embodiment, the upper support plate is separate from the head framework, and engages the head framework to secure the head framework relative to the cylinder structure assembly.

In one aspect of the engine block assembly, the cylinder structure assembly includes a sleeve forming a cylinder bore, and a lower framework supporting the sleeve. In one embodiment, the sleeve and/or the lower framework are manufactured from a metal. The sleeve includes an upper end disposed adjacent to the head structure assembly, and a lower end disposed adjacent to the lower framework.

In one aspect of the engine block assembly, the cylinder structure assembly includes at least one crank cap that at least partially forms a bearing journal or partially supports a bearing assembly. The cylinder structure assembly further includes at least one crank block that at least partially forms the bearing journal or partially supports a bearing assembly. A crankshaft is rotatably supported between the crank block and the crank cap, for rotation about a crank axis.

In one embodiment of the engine block assembly, the crank block extends between the lower framework and the crank cap. The sleeve is operable to transmit compressive forces from the plurality of fasteners between the head structure assembly and the lower framework, and the crank block is operable to transmit compressive forces from the plurality of fasteners between the lower framework and the crank cap.

In another embodiment of the engine block, the crank block extends between the head structure assembly and the at least one crank cap. The crank block is operable to transmit compressive forces from the plurality of fasteners between the head structure assembly and the crank cap.

In another aspect of the engine block assembly, an accessory is embedded in the outer shell. The accessory may include any device, such as but not limited to an electronic device. For example, the accessory may include, but is not limited to, a sensor, a connector, a thermoelectric generator, a wire harness, a wire connector, an electronic control unit/module, a threaded insert, etc.

A method of manufacturing an engine block assembly is also provided. The method includes forming a head framework. The head framework is formed to include an intake port, an exhaust port, and an upper combustion chamber portion. The head framework is formed to include a minimal amount of material necessary to resist the mechanical loads applied to the head framework. A cylinder structure assembly is assembled. The cylinder structure assembly is assembled from separate components that are designed to include the minimum amount of material necessary to resist the mechanical loads applied to the cylinder structure assembly. The components of the cylinder structure assembly include, but are not limited to, a sleeve forming a cylinder bore, a lower framework, a crankshaft, a crank block, and a crank cap. The head framework is attached to the cylinder structure assembly with a plurality of fasteners. A polymer is over-molded onto the head framework and the cylinder structure assembly to form an outer shell. The outer shell is a unitary structure encapsulating and supporting both the head structure assembly and the cylinder structure assembly.

In one aspect of manufacturing the engine block assembly, the head framework is formed using one of a three-dimensional printing process or an additive manufacturing process.

In one aspect of manufacturing the engine block assembly, over-molding the polymer onto the head framework and the cylinder structure assembly to form the outer shell includes forming at least one fluid passage in the outer shell for circulating a fluid therethrough. The fluid passage may include a head coolant passage in the outer shell for cooling the head framework, at least one cylinder coolant passage in the outer shell for cooling the sleeve, and/or a lubrication passage in the outer shell for circulating an engine lubricant therethrough. Forming the head coolant passage, the cylinder coolant passage, and/or the lubrication passage may be further defined as forming the head coolant passage, the cylinder coolant passage, and/or the lubrication passage with a lost-core molding process.

In one aspect of the method of manufacturing the engine block assembly, over-molding the polymer onto the head framework and the cylinder structure assembly to form the outer shell includes embedding an accessory into the polymer forming the outer shell, while over-molding the outer shell onto the head framework and the cylinder structure assembly.

In one aspect of the method of manufacturing the engine block assembly, an intake valve guide and an exhaust valve guide are attached to the head framework to form a head structure assembly. The head structure assembly may be assembled prior to over-molding the polymer onto the head framework and the cylinder structure assembly to form the outer shell.

Accordingly, the engine block assembly described above provides a unique engine architecture, having sufficient strength to resist operation loads, with minimal weight. The method of manufacturing the engine block assembly provides a unique process, in which the head structure assembly and the cylinder structure assembly are combined together as a single structure by the outer shell. This process reduces the number of steps required in manufacturing and assembling the engine block assembly.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the FIGS., wherein like numerals indicate like parts throughout the several views, an engine block assembly is generally shown at 20. The engine block assembly 20 is part of an internal combustion engine that may be adapted for use in any moveable or non-moveable platform. For example, the engine block assembly 20 may be adapted for use in moveable platforms, such as but not limited to, cars, trucks, tractors, ATV's, motorcycles, snowmobiles, boats airplanes, etc. The engine block assembly 20 may alternatively be adapted for use in non-moveable platforms, such as but not limited to, generators or other similar stationary applications. The engine block assembly 20 may be adapted for use with any fuel suitable for an internal combustion engine, such as but not limited to gasoline, diesel fuel, propane, compressed natural gas, ethanol, or combinations thereof.

Referring to FIGS. 1-4, the engine block assembly 20 includes a head structure assembly 22 and a cylinder structure assembly 24. The head structure assembly 22 includes the components generally associated with a cylinder head and an upper end of an internal combustion engine. The cylinder structure assembly 24 includes the components generally associated with an engine block and a lower end 52 of an internal combustion engine. The head structure assembly 22 and the cylinder structure assembly 24 each include structural components that are designed to resist the mechanical loads generated during operation of the engine block assembly 20, with a minimum amount of material and/or weight. A polymer is then over-molded onto the structural components of the head structure assembly 22 and the cylinder structure assembly 24 to form an outer shell 26 of the engine block assembly 20. The outer shell 26 provides additional structural integrity to the engine block assembly 20, enables the formation of lubrication and coolant passages, and provides for the attachment and support of various other components and/or accessories.

Figure 5:
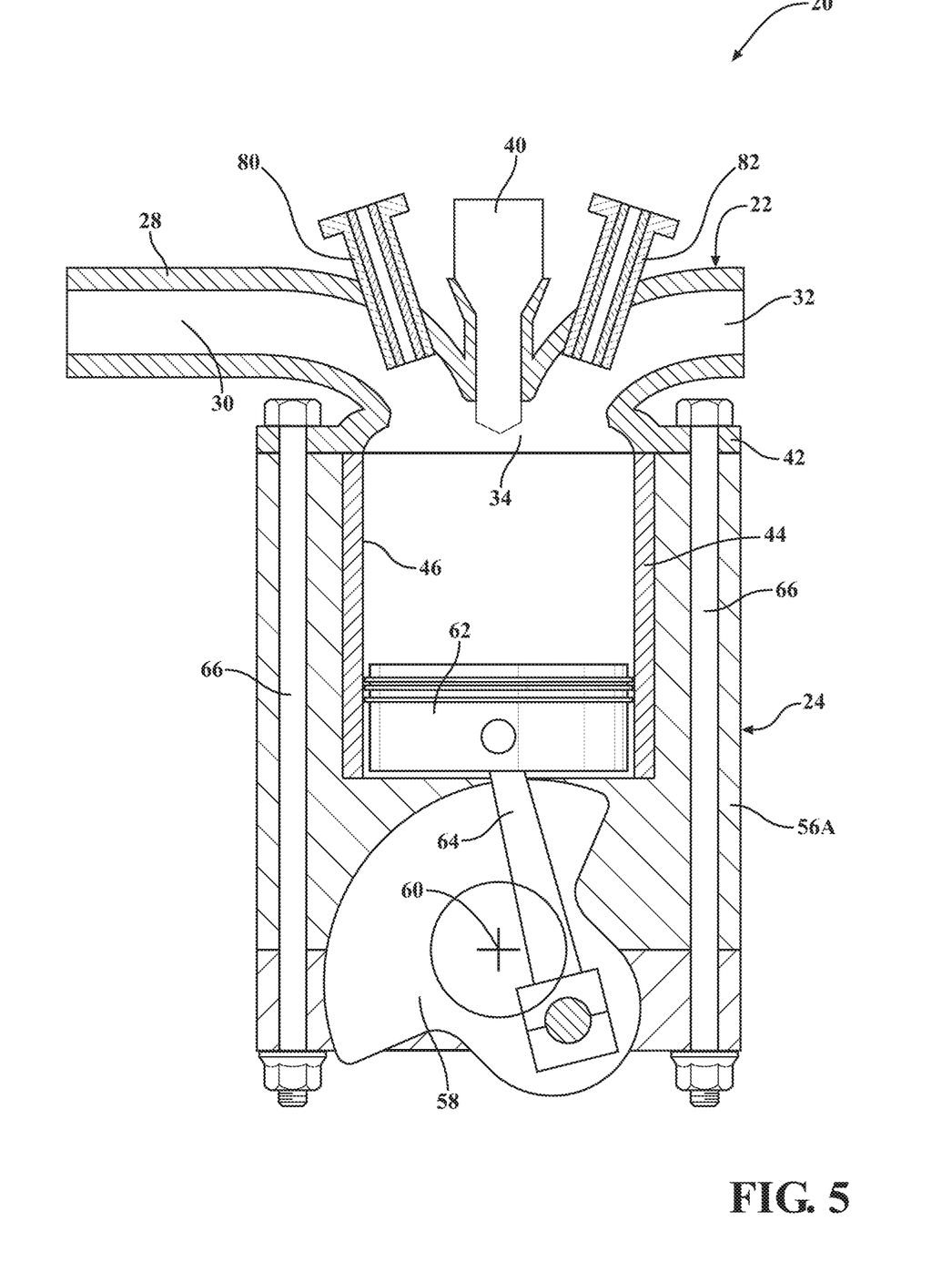
FIG. 5 is a schematic cross sectional view perpendicular to the crank axis showing a head structure assembly attached to a cylinder structure assembly.

Referring to FIG. 5, the head structure assembly 22 includes a head framework 28. The head framework 28 is a skeletal structure that defines and/or forms various aspects of the cylinder head assembly. Particularly, the head framework 28 defines and/or forms an intake port 30, an exhaust port 32, and an upper combustion chamber portion 34. While the description of the engine block assembly 20 refers to and describes only a single cylinder, it should be appreciated that the engine block assembly 20 may include any number of cylinders. For example, the engine block assembly 20 may include a single cylinder, two cylinders, three cylinders, four cylinders, etc. Accordingly, it should be appreciated that the head framework 28 will include an intake port 30, an exhaust port 32, and an upper combustion chamber portion 34 for each cylinder of the head structure assembly 22. The intake port 30 provides a fluid passage for supplying a flow of combustion air to a combustion chamber. The exhaust port 32 provides a fluid passage for discharging a flow of exhaust gas from the combustion chamber.

In one exemplary embodiment, the head framework 28 is a metal. However, it should be appreciated that other materials, or a combination of materials, may be used to form the head framework 28. As noted above, the head framework 28 is a skeletal structure, and is designed to provide the required strength and handle given loads for a specific application. The head framework 28 is shaped to provide the required strength, while minimizing the weight and/or mass of the head framework 28. Accordingly, the head framework 28 may be manufactured using a three-dimensional printing process, or some form of an additive manufacturing process, readily understood by those skilled in the art. 3D printing and additive manufacturing processes enable the manufacture of complex shapes that are capable of carrying the loads for the head structure assembly 22, while minimizing the weight of the head framework 28.

Referring to FIG. 5, the head structure assembly 22 may further include an intake valve guide 80, exhaust valve guide 82. The intake valve guide 80 slideably supports an intake valve 36 (shown in FIG. 6) as understood by those in the art. The intake valve 36 is operable to open and close fluid communication through the intake port 30. The exhaust valve guide 82 slideably supports an exhaust valve 38 (shown in FIG. 6.) as understood by those skilled in the art. The exhaust valve 38 is operable to open and close fluid communication through the exhaust port 32. The head structure assembly 22 may further support a combustion device 40 (shown in FIG. 6.) for each cylinder of the engine block assembly 20. The combustion device 40 may include, but is not limited a fuel injector, a spark plug, a glow plug, or some other device that supports combustion. The specific type, construction, and operation of the combustion device 40 is not pertinent to the teachings of this disclosure, and are therefore not described in detail herein.

Figure 6:
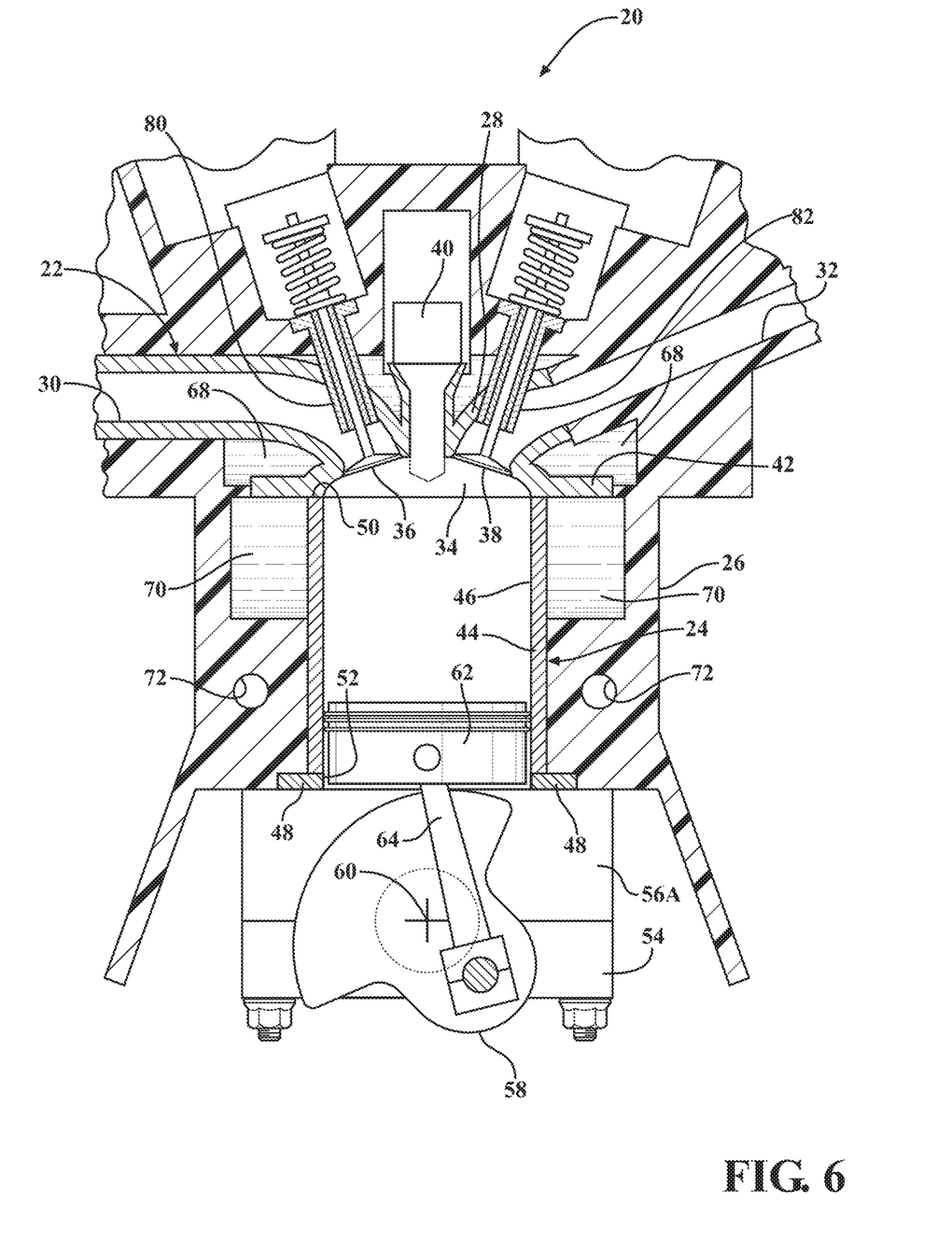
FIG. 6 is a schematic cross sectional view perpendicular to the crank axis showing an outer shell over-molded onto the head structure assembly and the cylinder structure assembly.

The head structure assembly 22 includes an upper support plate 42. In one embodiment, shown in FIGS. 1-4, the upper support plate 42 is separate from the head framework 28. In other embodiments, such as shown in FIGS. 5 and 6, the upper support plate 42 is integrally formed with the head framework 28 as a single manufacture. In one embodiment, the upper support plate 42 is a metal. However in other embodiments, the upper support plate 42 may be manufactured from a non-metal material.

Referring to FIGS. 1-4, the cylinder structure assembly 24 includes a sleeve 44, and a lower framework 48. The sleeve 44 forms a cylinder bore 46. In one embodiment, the sleeve 44 is a metal. In other embodiments, the sleeve 44 may be manufactured from a non-metal material, or a combination of metal and non-metal materials. The lower framework 48, best shown in FIGS. 2 through 4, supports the sleeve 44. In one embodiment, the lower framework 48 is a metal. However, in other embodiments, the lower framework 48 may be manufactured from a non-metal material, or a combination of metal and non-metal materials. The lower framework 48 is shaped to provide the required strength to support the sleeve 44 and other components of the engine block assembly 20, while minimizing the weight and/or mass of the lower framework 48. The lower framework 28 may be manufactured from a suitable process, such as but not limited to a three-dimensional printing process, or some form of an additive manufacturing process, readily understood by those skilled in the art. 3D printing and additive manufacturing processes enable the manufacture of complex shapes that are capable of carrying the loads for the cylinder structure assembly 24, while minimizing the weight of the lower framework 48. In one embodiment, the sleeve 44 includes an upper end 50 and a lower end 52. The upper end 50 of the sleeve 44 is disposed adjacent to the head structure assembly 22. The lower end 52 of the sleeve 44 is disposed adjacent to and supported by the lower framework 48. In other embodiments, the sleeve 44 is integrally formed with the lower framework 48.

Figure 1:
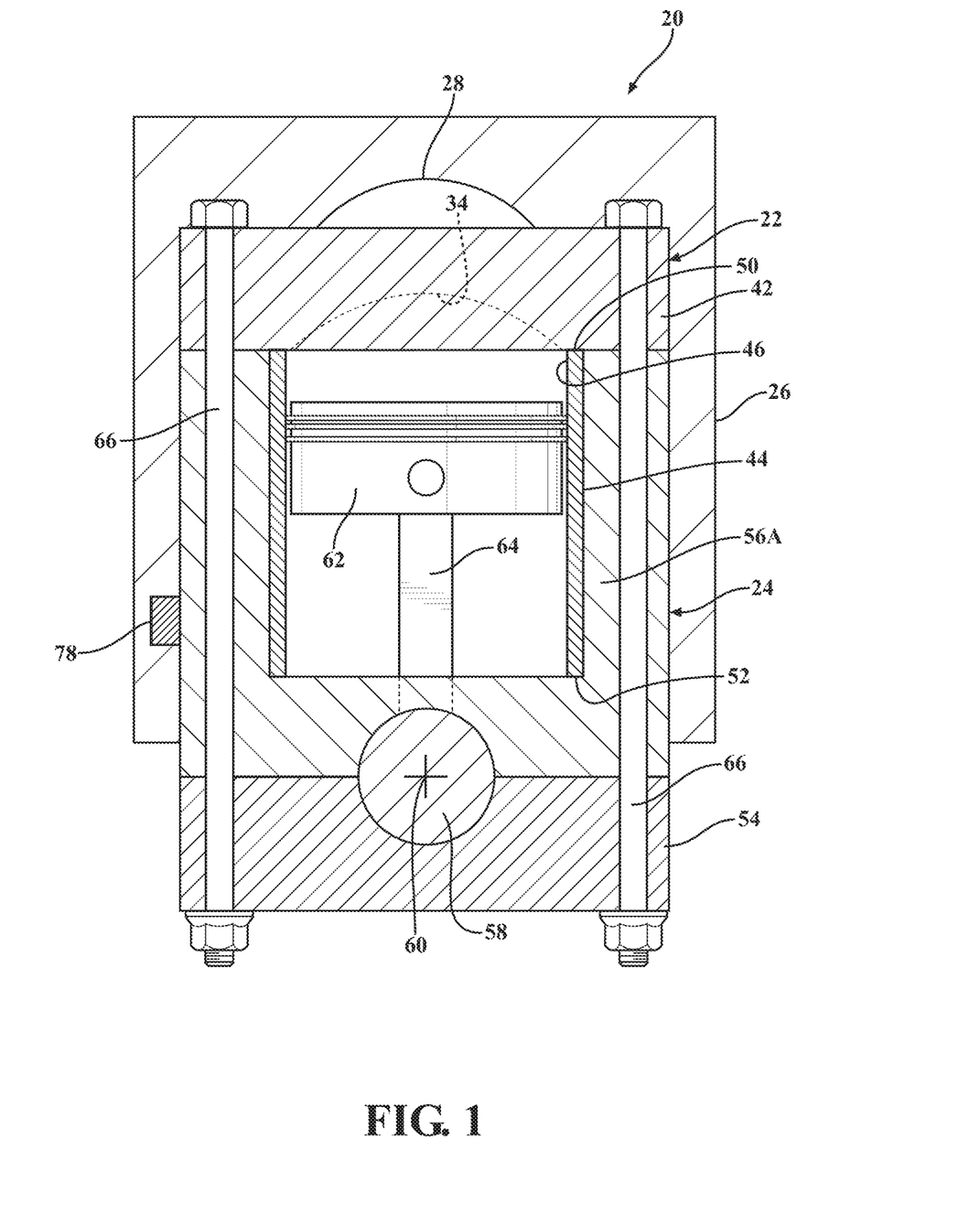
FIG. 1 is a schematic cross sectional view perpendicular to a crank axis of a first embodiment of an engine block assembly.
Figure 2:
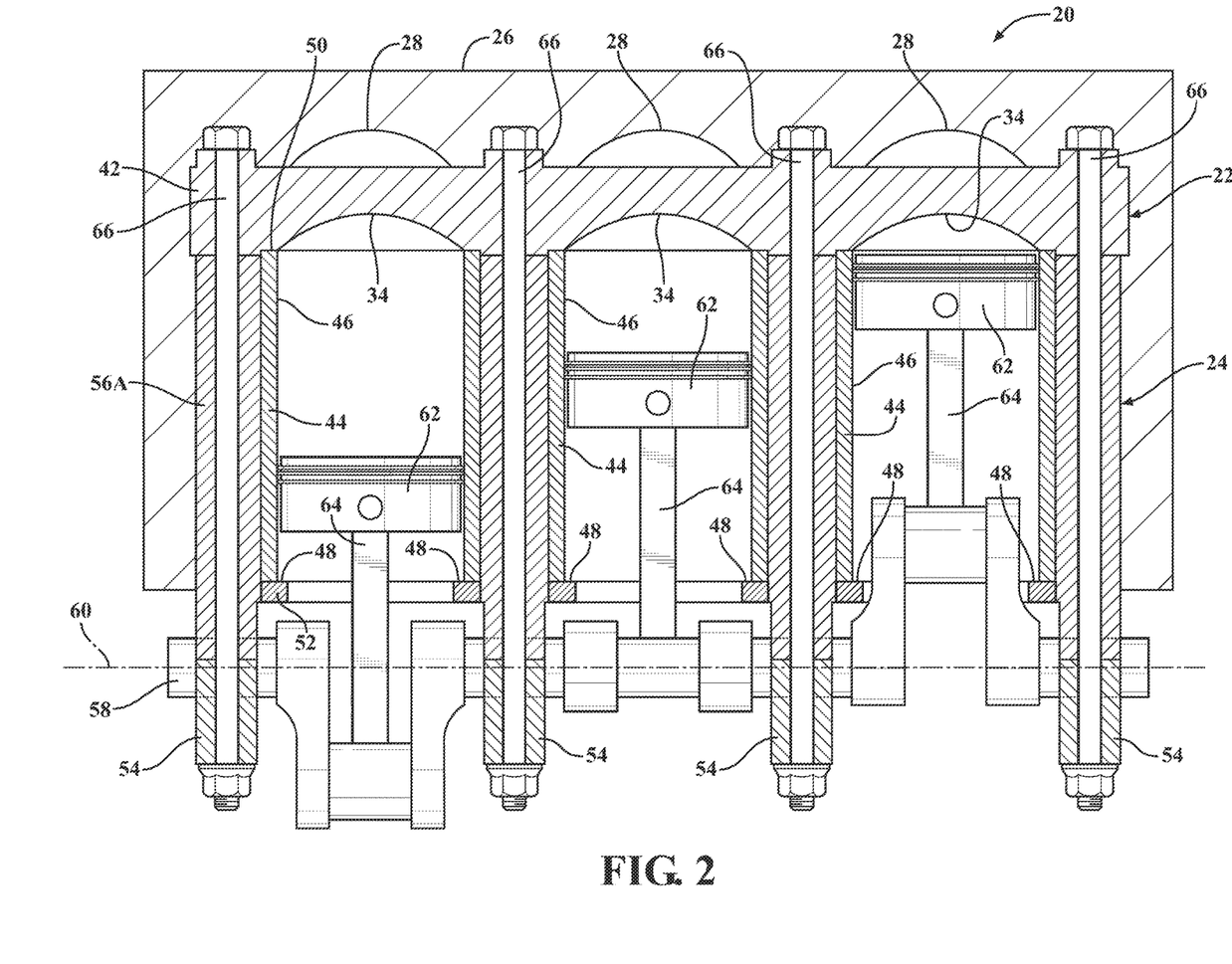
FIG. 2 is a schematic cross sectional view parallel to the crank axis of the first embodiment of the engine block assembly.
Figure 3:
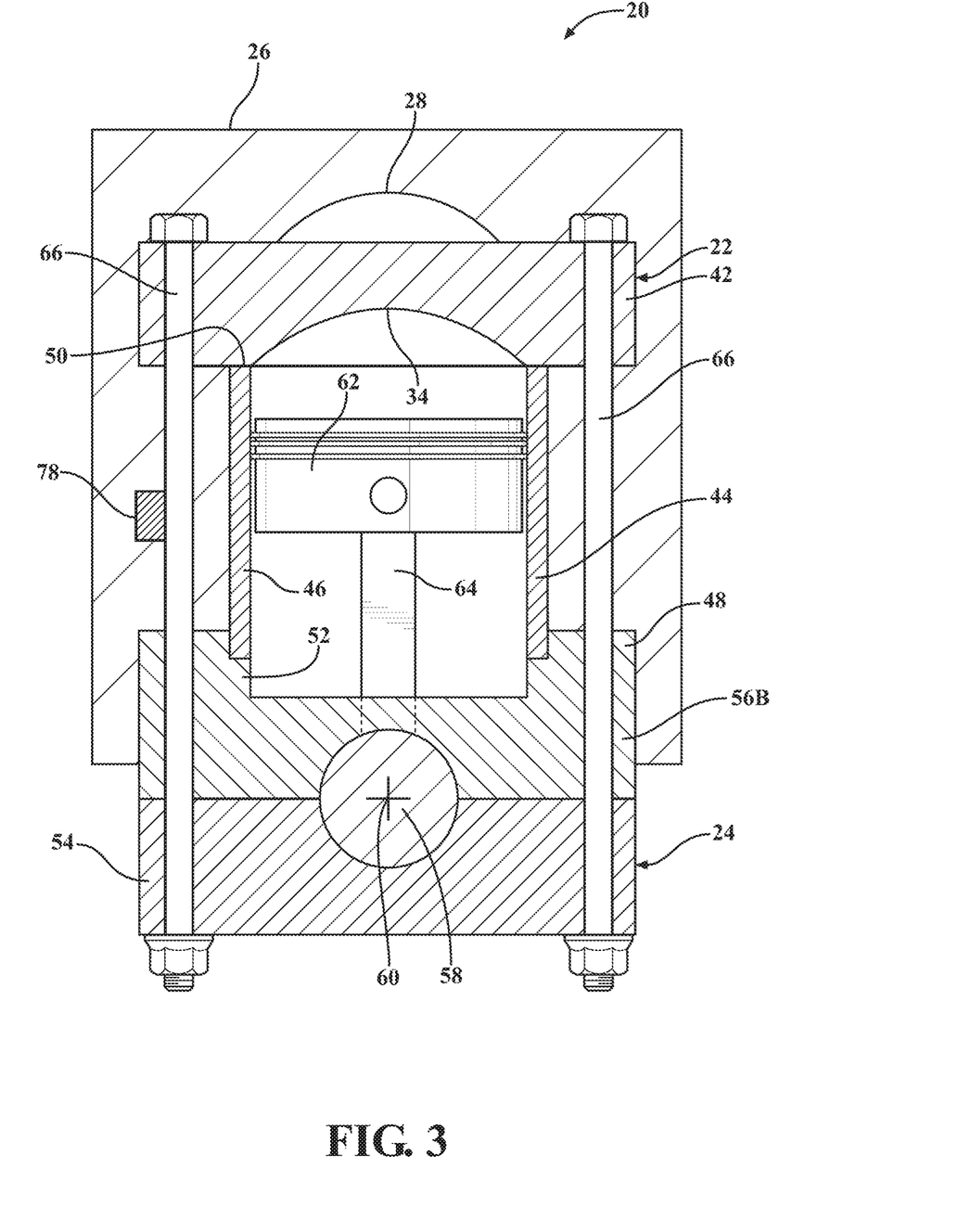
FIG. 3 is a schematic cross sectional view perpendicular to the crank axis of a second embodiment of the engine block assembly.
Figure 4:
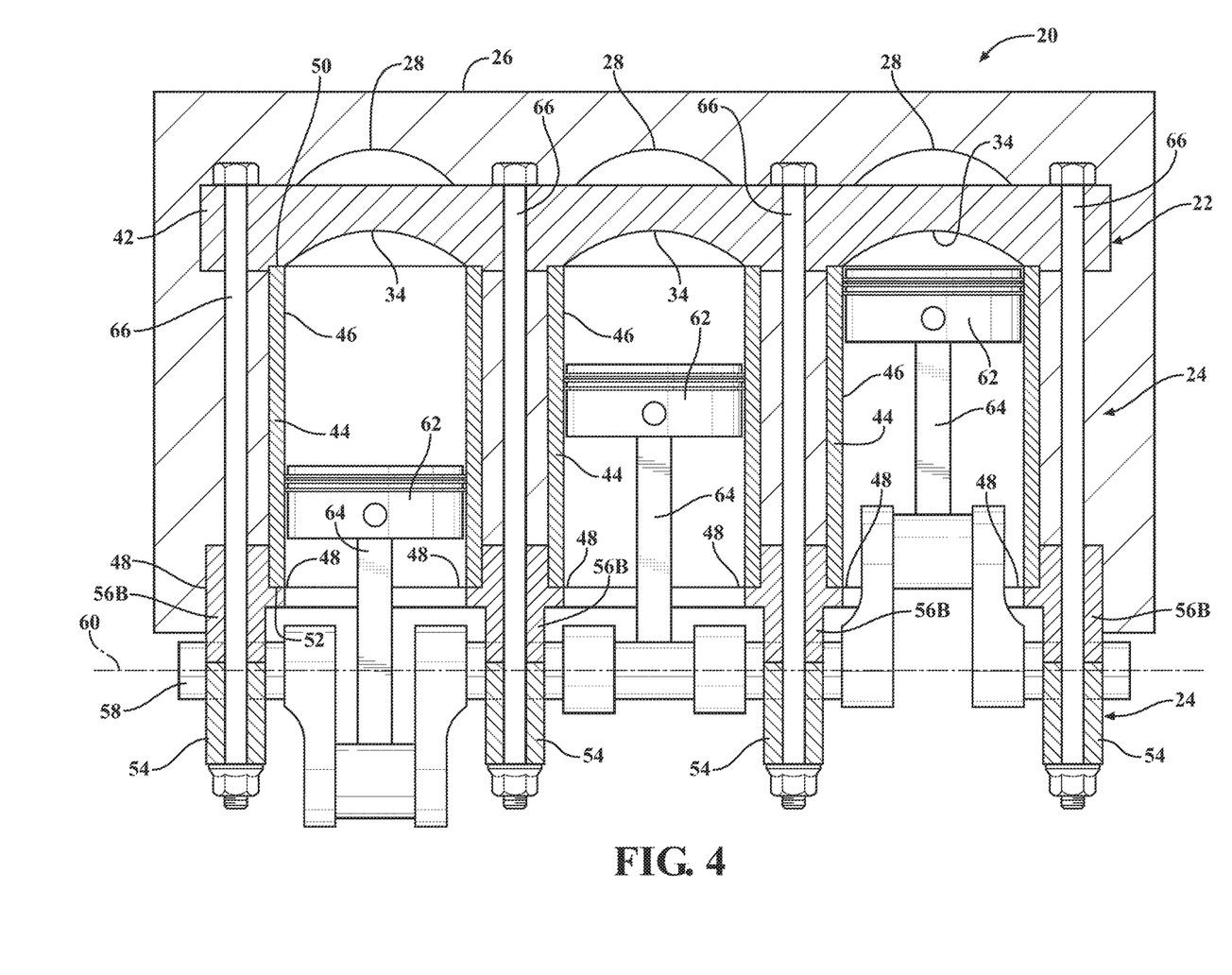
FIG. 4 is a schematic cross sectional view parallel to the crank axis of the second embodiment of the engine block assembly.

Referring to FIGS. 1-4, the cylinder structure assembly 24 includes at least one crank cap 54 and at least one crank block 56A, 56B. The crank blocks 56A, 56B may be part of and integrally formed with the lower framework 48. In other embodiments, the crank blocks 56A and 56B are separate components attached to the lower framework 48. A first embodiment of the crank blocks are shown in FIGS. 1 and 2 and identified by reference numeral 56A. A second embodiment of the crank blocks are shown in FIGS. 3 and 4 and identified by reference numeral 56B. The crank cap 54 and the crank block 56A, 56B cooperate to form a bearing journal, or alternatively support a bearing assembly therebetween. As such, the crank cap 54 forms a lower half of each respective bearing journal or supports a lower half of a bearing assembly, and the crank block 56A, 56B forms an upper half of each respective bearing journal or supports an upper half of the bearing assembly. It should be appreciated that the engine block assembly 20 may include one more crank cap 54 and one more crank block 56A, 56B than the total number of cylinders of the engine block assembly 20. For example, if the engine block assembly 20 is configured to include three cylinders, such as shown in FIGS. 2 and 4, then the engine block assembly 20 may include four crank caps 54 and four crank blocks 56A, 56B.

Referring to FIGS. 1-4, a crankshaft 58 is rotatably supported between the crank blocks 56A, 56B and the crank caps 54, for rotation about a crank axis 60. The specific configuration of the crankshaft 58 is not pertinent to the teachings of this disclosure, and are therefore not described in detail herein. Further, each cylinder of the engine block assembly 20 includes a respective piston 62 and connecting rod 64 attaching the piston 62 to the crankshaft 58, as is understood by those skilled in the art. As is understood by those skilled in the art, the connecting rods 64 are eccentrically attached to the crankshaft 58, relative to the crank axis 60, so that rotation of the crankshaft 58 about the crank axis 60 causes the pistons 62 to move within their respective cylinder in a reciprocating motion. Furthermore, as understood by those in the art, the upper combustion chamber portion 34, the sleeve 44, and a top surface of the piston 62 cooperate to define a combustion chamber therebetween.

Referring to FIGS. 1-4, the engine block assembly 20 includes a plurality of fasteners 66 that interconnect the head structure assembly 22 and the cylinder structure assembly 24. The fasteners 66 engage the upper support plate 42 and the block caps to secure the head structure assembly 22 and the cylinder structure assembly 24 together. In one embodiment, the fasteners 66 includes bolts, with each respective bolt extending through the upper support plate 42, one of the crank blocks 56A, 56B, the lower framework 48, and one of the crank caps 54. In another embodiment, the fasteners 66 include straps, with each respective strap wrapped around an outer circumference of the upper support plate 42, one of the crank blocks 56A, 56B, the lower framework 48, and one of the crank caps 54. The straps may be metal straps, or may include a fiber reinforced polymer strap that is cured in place.

Referring to FIGS. 3 and 4, the crank blocks 56B extend between the lower framework 48 and the crank caps 54. In this embodiment, the sleeve 44 is operable to transmit compressive forces from the plurality of fasteners 66, between the upper support plate 42 of the head structure assembly 22 and the lower framework 48. The crank blocks 56B are operable to transmit the compressive forces from the plurality of fasteners 66, between the lower framework 48 and the crank caps 54. Accordingly, in this embodiment, the sleeves 44 are used to transmit the compressive forces between the head structure assembly 22 and the crank caps 54.

Referring to FIGS. 1 and 2, the crank blocks 56A extend between the upper support plate 42 of the head structure assembly 22 and the crank caps 54. The crank blocks 56A are operable to transmit the compressive forces from the plurality of fasteners 66, between the upper support plate 42 of the head structure assembly 22 and the crank caps 54. Accordingly, in this embodiment, the sleeves 44 do not transmit the compressive forces, and their thickness and weight may be reduced accordingly.

As noted above, the engine block assembly 20 includes the outer shell 26, which at least partially encapsulates and supports both the head structure assembly 22 and the cylinder structure assembly 24. Referring to FIG. 6, the outer shell 26 is a unitary polymer structure, which is simultaneously over-molded onto both the head structure assembly 22 and the cylinder structure assembly 24. As such, the outer shell 26 permanently encapsulates the head framework 28, the fasteners 66, and at least partially encapsulates the cylinder structure assembly 24, such that the head framework 28 and the fasteners 66 are not removable from the cylinder structure assembly 24. The outer shell 26 may provide additional structural integrity to increase the torsional and bending stiffness of the engine block assembly 20. The polymer forming the outer shell 26 may include a continuous fiber reinforcement, non-continuous fiber reinforcement, or a combination of both. The polymer used to form the outer shell 26 may include, but is not limited to thermoplastics such as polyamides, polypropylene, polyimides, polyamide-imide, PPS, PPA, or thermosets such as epoxy, phenolic, BMI, polyimide, cyanate ester, or polyurethane.

Referring to FIG. 6, the outer shell 26 may define one or more fluid passages for circulating fluid there through. For example, the outer shell 26 may be formed to define one or more head coolant passages 68, one or more cylinder coolant passages 70, and one or more lubrication passages 72. The head coolant passages 68 may be positioned adjacent the head framework 28 and operable to circulate a coolant for cooling the head framework 28. For example, the exhaust port 32 may be exposed to high temperatures, and require cooling in order to be in contact with the polymer forming the outer shell 26 adjacent the exhaust port 32. Similarly, the cylinder coolant passages 70 may be positioned adjacent the sleeve 44 and operable to circulate a coolant for cooling the sleeve 44. The combustion chamber, at least partially formed by the sleeve 44, is also exposed to high temperatures, and may require cooling in order to be in contact with the polymer forming the outer shell 26 adjacent the sleeve 44. The lubrication passages 72 may be positioned to circulate and supply various components of the engine block assembly 20, such as but not limited to engine bearings, with a lubricant.

Figure 7:
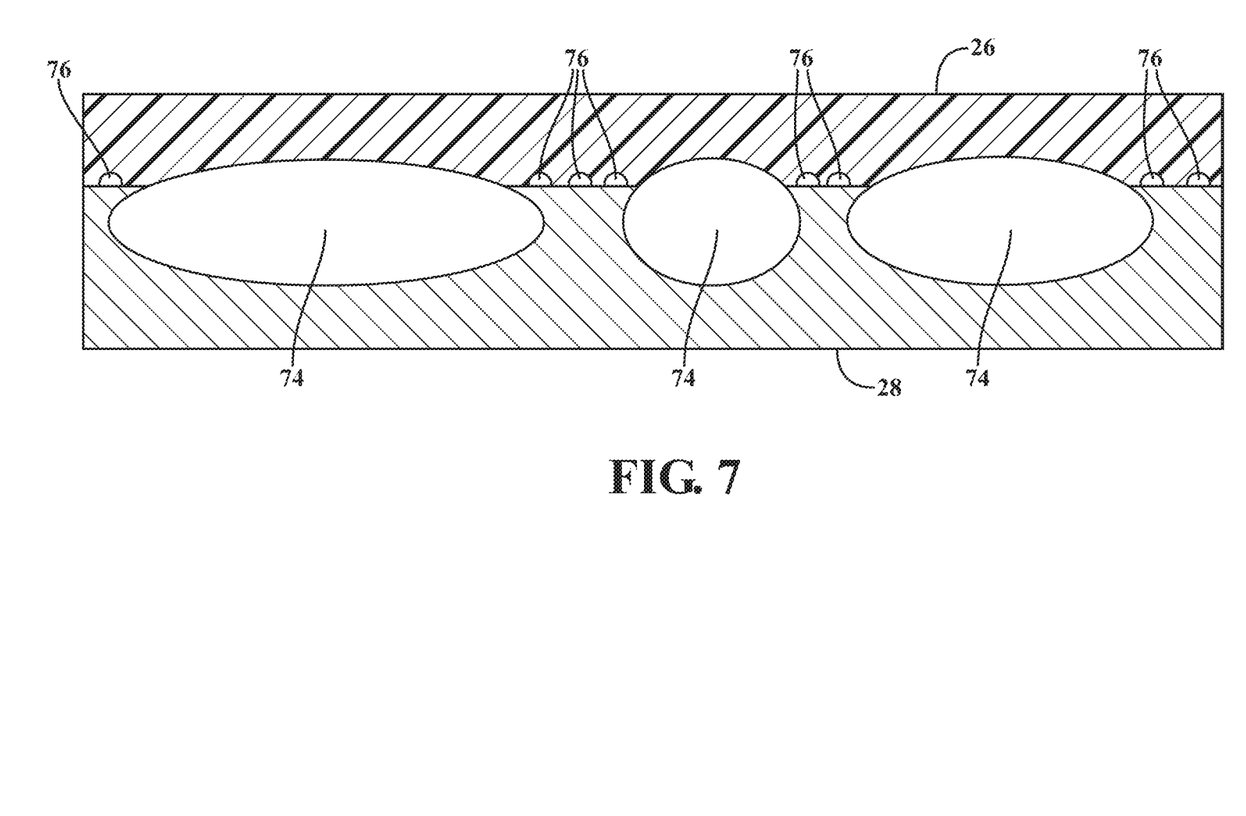
FIG. 7 is an enlarged schematic cross sectional view showing a head coolant passage.

The head coolant passages 68, the cylinder coolant passages 70, and the lubrication passages 72 may be shaped and/or configured in any suitable manner for circulating the fluid therethrough. For example, referring to FIG. 7, the head coolant passage 68 may include a plurality of larger passages 74, and a plurality of smaller, vascular passages 76. FIG. 7 shows the exhaust port 32 of the head framework 28 and the outer shell 26 disposed adjacent thereto. The head coolant passages 68 include the larger passages 74, and the smaller vascular passages 76, disposed at the interface of the head framework 28 and the outer shell 26.

Referring to FIGS. 1 and 3, the engine block assembly 20 may further include an accessory 78 that is at least partially embedded in the outer shell 26. The accessory 78 may include, but is not limited to, an electronic device. For example, the accessory 78 may include, but is not limited to, a sensor, an electrical connector, a thermoelectric generator, a wire harness, an electronic control unit/module, etc. Alternatively, the accessory 78 may include some other device, such as but not limited to, a support bracket for attaching an ancillary component, a threaded insert for receiving a bolt, a threaded stud for receiving a nut, an actuator, an electric motor, etc.

A method of manufacturing the engine block assembly 20 is also provided. Referring to FIG. 5, the method includes forming the head framework 28. As noted above, the head framework 28 is formed to define the intake port 30, the exhaust port 32, and the upper combustion chamber portion 34 for each cylinder of the engine block assembly 20. The head framework 28 may be formed from a metal, using a three-dimensional printing process, an additive manufacturing process, or some other forming process not specifically mentioned or described herein. As noted above, the head framework 28 is formed to provide the required strength, while minimizing the weight of the head framework 28.

Once the head framework 28 has been formed, other components may be attached to the head framework 28 to form the head structure assembly 22. For example, the intake valve guides 80 and the exhaust valve guides 82 may be attached to the head framework 28. In the exemplary embodiment described herein, the components of the head structure assembly 22, including the head framework 28, the intake valve guides 80, and the exhaust valve guides 82, are attached together prior to over-molding the outer shell 26 onto the head structure assembly 22. Other components of the head structure assembly may be added after the outer shell 26 is molded onto the head structure, such as but not limited to the intake valves 36, the exhaust valves 38 and the fuel injectors 40.

Referring to FIG. 5, the cylinder structure assembly 24 is also formed. As noted above, the cylinder structure assembly 24 may include, but is not limited to, the sleeves 44 to form the cylinder bores 46, the lower framework 48, and the crank blocks 56A, 56B. The cylinder structure assembly 24 may further be formed to include the crankshaft 58, the crank caps 54, the pistons 62 and connecting rods 64, bearings, etc. It should be appreciated that forming the cylinder structure assembly 24 may include, but is not limited to, forming or shaping the various components of the cylinder structure assembly 24, as well as attaching the various components of the cylinder structure assembly 24 together. For example, forming the cylinder structure assembly may include forming the lower framework 48 integrally with the crank blocks 56A, 56B, or forming the lower framework 48 and attached the crank blocks 56A, 56B thereto. Similarly, forming the cylinder structure assembly 24 may include forming the lower framework 48 integrally with the sleeve 44, or forming the lower framework 48 and then attaching the sleeve 44 thereto. Additionally, in some embodiments, forming the cylinder structure assembly may include attaching other components, such as but not limited to the connecting rods 64 and the pistons 62, and the crankshaft 58, positioning the pistons 62 within the cylinder bores 46, positioning the crankshaft 58 between the crank blocks 56A, 56B and the crank caps 54, and positioning the crank blocks 56A, 56B relative to the sleeves 44, etc.

Referring to FIG. 5, once the head structure assembly 22 and the cylinder structure assembly 24 have been assembled, the head structure assembly 22 and the cylinder structure assembly 24 are attached together using the plurality of fasteners 66. If the head framework 28 incorporates the upper support plate 42 as an integral part thereof, then the fasteners 66 connect the head framework 28 and the crank caps 54, and clamp the crankshaft 58, the crank blocks 56A, 56B, the lower framework 48, and the sleeves 44 therebetween. If the upper support plate 42 is separate from the head framework 28, then the fasteners 66 connect the upper support plate 42 and the crank caps 54, and clamp the crankshaft 58, the crank blocks 56A, 56B, the lower framework 48, the sleeves 44, and the head framework 28 therebetween. As noted above, the fasteners 66 may include bolts and corresponding nuts, carbon fiber straps, metal straps, or some other device capable of securing the head structure assembly 22 and the cylinder structure assembly 24 together.

Referring to FIG. 6, once the head structure assembly 22 and the cylinder structure assembly 24 have been attached together with the fasteners 66, a polymer is over-molded onto the head structure assembly 22 and the cylinder structure assembly 24 to form the outer shell 26. As noted above, the outer shell 26 is a unitary structure that partially encapsulates and supports the head structure assembly 22 and the cylinder structure assembly 24. Because the outer shell 26 is a unitary structure over-molded onto both the head structure assembly 22 and the cylinder structure assembly 24, including the fasteners 66 connecting them, the head structure assembly 22 and the cylinder structure assembly 24 are permanently affixed to each other. As such, the portion of the outer shell 26 disposed about the head framework 28 is integral with and not separate from the portion of the outer shell 26 disposed about the cylinder structure assembly 24. Accordingly, the block portion and the head portion of the engine block assembly 20 are integrally formed together as a single unit, and are not separable.

As described above, at least one head coolant passage 68, at least one cylinder coolant passage 70, and/or at least one lubrication passage 72 may be formed in the outer shell 26 during the over-molding process. For example, a lost-core molding process may be used to form the head coolant passages 68, the cylinder coolant passages 70, and/or the lubrication passages 72. As understood by those skilled in the art, the lost-core molding process includes placing a form in the desired location of a passage, and then over-molding the outer shell 26 onto the form. The form is then removed, such as by heating and melting the form from the outer shell 26, thereby leaving a void forming the passage, burning out the form, or dissolving the form. Other machining and/or molding processes may be used to form the various different passages in the outer shell 26.

It should be appreciated that when molding the outer shell 26 over the head structure assembly 22 and the cylinder structure assembly 24, that the shape and placement of the crankshaft 58 and the crank caps 54 must be considered. Accordingly, it may be necessary to place a form for the crankshaft 58 and crank caps 54 in the cylinder structure assembly 24 prior to over molding the outer shell thereon. Alternatively, the outer shell and/or the lower framework 48 may be machined or otherwise formed to accept various components of the engine, such as the crankshaft 58, crank caps 54, pistons 62, etc.

Additionally, the over-molding process used to form the outer shell 26 may include at least partially embedding an accessory 78 into the polymer forming the outer shell 26. As noted above, the accessory 78 may include, but is not limited to, an electronic device. For example, the accessory 78 may include, but is not limited to, a sensor, an electrical connector, a thermoelectric generator, a wire harness, an electronic control unit/module, etc. Alternatively, the accessory 78 may include some other device, such as but not limited to, a support bracket for attaching an ancillary component, a threaded insert for receiving a bolt, a threaded stud for receiving a nut, an actuator, an electric motor, etc.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. An engine block assembly comprising:
    a head structure assembly;
    a cylinder structure assembly;
    a plurality of fasteners interconnecting the head structure assembly and the cylinder structure assembly; and
    an outer shell over-molded onto both the head structure assembly and the cylinder structure assembly as a unitary polymer structure integral with both the head structure assembly and the cylinder structure assembly, such that the outer shell is not removable from the head structure assembly and the cylinder structure assembly, and permanently encapsulates and supports both the head structure assembly and the cylinder structure assembly.

2. The engine block assembly set forth in claim 1, wherein the head structure assembly includes a head framework including an intake port, an exhaust port, and an upper combustion chamber portion.

3. The engine block assembly set forth in claim 2, wherein the head structure assembly includes an intake valve guide and an exhaust valve guide.

4. The engine block assembly set forth in claim 2, wherein the outer shell defines a fluid passage operable to circulate a fluid therethrough.

5. The engine block assembly set forth in claim 2, wherein the head structure assembly includes an upper support plate engaging the plurality of fasteners.

6. The engine block assembly set forth in claim 5, wherein the upper support plate and the head framework are integrally formed together as a single manufacture.

7. The engine block assembly set forth in claim 1, wherein the cylinder structure assembly includes a sleeve forming a cylinder bore.

8. The engine block assembly set forth in claim 7, wherein the outer shell defines a cylinder coolant passage adjacent the sleeve, wherein the cylinder coolant passage is operable to circulate a coolant for cooling the sleeve.

9. The engine block assembly set forth in claim 7, wherein the cylinder structure assembly includes a lower framework supporting the sleeve.

10. The engine block assembly set forth in claim 9, wherein the sleeve includes an upper end disposed adjacent to the head structure assembly, and a lower end disposed adjacent to the lower framework.

11. The engine block assembly set forth in claim 10, wherein the cylinder structure assembly includes at least one crank cap.

12. The engine block assembly set forth in claim 11, wherein the cylinder structure assembly includes at least one crank block.

13. The engine block assembly set forth in claim 12, wherein the cylinder structure assembly includes a crankshaft rotatably supported between the at least one crank block and the at least one crank cap, for rotation about a crank axis.

14. The engine block assembly set forth in claim 12, wherein the at least one crank block extends between the lower framework and the at least one crank cap, and wherein the sleeve is operable to transmit compressive forces from the plurality of fasteners between the head structure assembly and the lower framework, and with the at least one crank block operable to transmit compressive forces from the plurality of fasteners between the lower framework and the at least one crank cap.

15. The engine block assembly set forth in claim 12, wherein the at least one crank block extends between the head structure assembly and the at least one crank cap, and wherein the at least one crank block is operable to transmit compressive forces from the plurality of fasteners between the head structure assembly and the at least one crank cap.

16. The engine block assembly set forth in claim 1, further comprising an accessory embedded in the outer shell.

17. A method of manufacturing an engine block assembly, the method comprising:

forming a head framework that defines an intake port, an exhaust port, and an upper combustion chamber portion;

forming a cylinder structure assembly, which includes at least a sleeve forming a cylinder bore, a lower framework, and a crank block;

attaching the head framework to the cylinder structure assembly with a plurality of fasteners; and over-molding a polymer onto the head framework and the cylinder structure assembly to form an outer shell, wherein the outer shell is not removable from the head framework and the cylinder structure assembly, and is a unitary structure permanently encapsulating and supporting the head framework and the cylinder structure assembly.

18. The method set forth in claim 17, wherein forming the head framework is further defined as forming the head framework using one of a three-dimensional printing process or an additive manufacturing process.

19. The method set forth in claim 17, further comprising forming at least one head coolant passage in the outer shell, at least one cylinder coolant passage in the outer shell, or at least one lubrication passage in the outer shell.

20. The method set forth in claim 17, wherein over-molding the polymer onto the head framework and the cylinder structure assembly to form the outer shell includes embedding an accessory into the polymer forming the outer shell while over-molding the outer shell.

* * * * *